(12) United States Patent
Liu et al.

(10) Patent No.: US 7,433,814 B2
(45) Date of Patent: Oct. 7, 2008

(54) NETWORK EMULATOR ARCHITECTURE

(75) Inventors: Yunxin Liu, Beijing (CN); Zheng Ni, Beijing (CN); Jian Wang, Beijing (CN); Qian Zhang, Beijing (CN); Wenwu Zhu, Basking Ridge, NJ (US)

(73) Assignee: Microsoft Corporation, Redmond, WA (US)

(*) Notice: Subject to any disclaimer, the term of this patent is extended or adjusted under 35 U.S.C. 154(b) by 424 days.

(21) Appl. No.: 10/955,993

(22) Filed: Sep. 30, 2004

(65) Prior Publication Data

US 2006/0069544 A1    Mar. 30, 2006

(51) Int. Cl.
*G06F 9/455* (2006.01)

(52) U.S. Cl. ............... 703/23; 703/24; 703/25; 703/28

(58) Field of Classification Search ............ 703/23–28; 370/241; 709/238
See application file for complete search history.

(56) References Cited

U.S. PATENT DOCUMENTS

| | | | |
|---|---|---|---|
| 5,636,371 A * | 6/1997 | Yu | 703/26 |
| 6,674,726 B1 | 1/2004 | Kado et al. | 370/253 |
| 6,785,241 B1 | 8/2004 | Lu et al. | 370/241 |
| 6,865,185 B1 | 3/2005 | Patel et al. | 370/412 |
| 6,961,941 B1 | 11/2005 | Nelson et al. | 719/319 |
| 7,142,513 B2 | 11/2006 | Sun et al. | 370/232 |
| 2004/0120319 A1 | 6/2004 | Asawa et al. | 370/395.4 |
| 2004/0199370 A1* | 10/2004 | Arama et al. | 703/20 |
| 2005/0007958 A1 | 1/2005 | Auerbach | 370/241 |
| 2006/0067351 A1 | 3/2006 | Liu et al. | 370/429 |
| 2006/0069544 A1 | 3/2006 | Liu et al. | 703/27 |
| 2007/0165528 A1 | 7/2007 | Brown et al. | 370/235 |

OTHER PUBLICATIONS

Mogul et al., "The Packet Filter: An Efficient Mechanism for User-Level Network Code", ACM Operating Systems Review, SIGOPS, Nov. 1987, pp. 1-26.*
Fall, "Network Emulation in the VINT/NS Simulator", Proceedings of the fourth IEEE Symposium on Computers and Communications, Jul. 1999, pp. 1-7.*
Simmonds et al., "Towards Scalable Network Emulation", Computer Communications, vol. 26, Issue 3, Feb. 2003, pp. 264-277.*
Zheng et al., "EMPOWER: A Cluster Architecture Supporting Network Emulation", IEEE Transactions on Parallel and Distributed Systems, Jul. 2004, pp. 617-629.*

* cited by examiner

*Primary Examiner*—Kamini Shah
*Assistant Examiner*—Herng-der Day
(74) *Attorney, Agent, or Firm*—Merchant & Gould PC; Timothy P. Sullivan

(57) ABSTRACT

A network emulator provides both per-connection and non-connection-based emulation. The emulator includes a host computer, and a kernel-mode emulator driver and user-mode application component running on the host computer. The application component supplies configuration parameters to the driver. The driver includes a packet filter list that filters a captured packet, a virtual network link that receives the packet from the packet filter list, a link group list that applies an emulation procedure to the packet, a timer management component that manages a timer associated with the emulation procedure, and a packet dispatcher component that sends out the packet. A connection pool component facilitates per-connection emulation.

22 Claims, 6 Drawing Sheets

NETWORK EMULATOR ARCHITECTURE

FIELD OF THE INVENTION

The present invention relates generally to computer systems and computer networks, and more particularly to systems and methods for emulating network links.

BACKGROUND OF THE INVENTION

Links across interconnected networks vary substantially with respect to such factors as bandwidth, packet latency, and error and loss rates. Before network protocols and distributed applications are deployed in a real network, it is critical that they be thoroughly tested under various realistic network conditions, to ensure correctness and to verify performance characteristics. Testing in an isolated real network is generally impractical. Therefore, testing typically involves simulation and emulation.

Network simulators generally attempt to provide a rich set of protocol modules and configuration tools suitable for conducting customized simulation experiments. However, network simulation suffers from a number of limitations. Simulators rely principally on models of both the physical network infrastructure and networking protocols. Models by definition only approximate the real conditions being tested, and in complex situations it is often impossible to develop accurate models for purposes of simulation. The functionalities provided by simulation modules are merely logical operations; thus, an implementation in a simulator must be modified before it can be deployed within a target network. Network simulators consume significant resources when the network being simulated is sufficiently large, and they do not provide a view of the network end user's experience.

By contrast, network emulators permit applications and protocols to be tested in real time, on real machines, such as locally-linked computers, using real implementations of network protocols. An emulator includes a supplementary means for imposing synthetic delays and faults on the real network traffic. In effect, the emulator comprises a virtual network with respect to the host machine or machines on which the network applications being tested are running. For a network emulator to be useful, however, it is necessary that it be designed and structured in such a way that various large-scale network conditions may be emulated accurately and realistically as well as efficiently and economically.

SUMMARY OF THE INVENTION

The present invention is generally directed towards a system and method for emulation of a network link, including both per-connection and non-connection-based emulation.

In accordance with one embodiment of the invention, a system for network emulation is provided. The system includes a host computer, and a kernel-mode emulator driver and user-mode application component running on the host computer. The application component supplies configuration parameters to the driver. The driver includes a packet filter list that filters a captured packet, a virtual network link that receives the packet from the packet filter list, a link group list that applies an emulation procedure to the packet, a timer management component that manages a timer associated with the emulation procedure, and a packet dispatcher component that sends out the packet. The host computer has at least one network interface and may be linked by way of a local physical network to one or more additional hosts, nodes or other networking devices.

According to one aspect of the invention, the driver includes a connection pool component for per-connection emulation. Each link group in the link group list is associated with a particular emulation configuration and includes one or more virtual link pairs. Emulation procedures applied to packets and embodied in modules in the driver include a bandwidth and queue emulation procedure, a latency emulation procedure, a packet loss emulation procedure, an error propagation emulation procedure, a packet out-of-order emulation procedure, and a background traffic emulation procedure.

The driver may include a tracing component for reporting information regarding the processed packets. The application component may include a dynamically-linked library exposing an application programming interface and a graphical user interface for monitoring the emulation.

In accordance with another embodiment of the invention, a method for emulating a network link on a host computer is provided. The method includes specifying an emulator configuration, filtering captured packets, applying emulation procedures to matched packets, reporting information regarding the packets, and dispatching the packets.

Embodiments of the invention implemented in hardware, software, and combinations thereof are contemplated.

DETAILED DESCRIPTION OF THE INVENTION

The present invention includes a network emulator framework within which real network traffic, such as IP traffic, is processed in order to achieve realistic and accurate emulation results based on user-configured settings. Emulation procedures occur in kernel mode on an emulator link, which comprises a virtual network link. A plurality of emulation algorithms are employed, based on well-formed mathematical models for emulation of various network characteristics and conditions, including bandwidth, queue, packet loss, latency, error propagation, packet out-of-order, and background traffic. The invention is usable for emulation of wired and wireless network scenarios. In one embodiment, the invention provides a flexible software-based network emulator for use in a conventional general-purpose computing system, although embodiments incorporating the invention wholly or partly in hardware or in special-purpose devices are also contemplated. A network emulator in accordance with the invention provides per-connection emulation as well as non-connection-based emulation.

Figure 1:
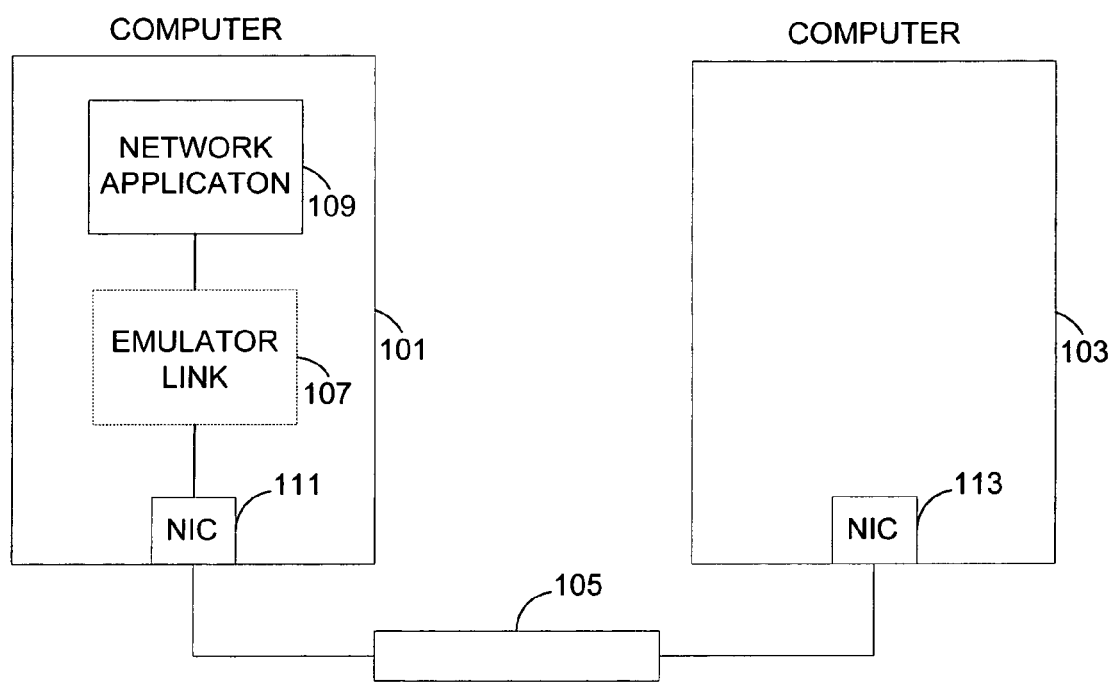
FIG. 1 is a block diagram providing a simplified illustration of one possible environment in which the present invention may be incorporated.

Turning to the drawings, FIG. 1 provides a simple illustration of one possible environment in which the present invention may be incorporated. Two computers 101, 103, each having one or more network interface cards (NICs) 111, 113, are linked by way of a local network connection 105, as for example an Ethernet link. The computers 101, 103 may be computing machines of various sorts, such as personal computers, servers, workstations, portable computers, special-purpose computing devices, and the like, having appropriate network interfaces, as well as, at a minimum, such components as a processor, memory storage, and input and output interfaces. In a representative environment one computer, such as the computer 101, runs a server program, such as a TCP or UDP server, and another machine, such as the computer 103, runs a client program, such as a TCP or UDP client. The features of the various computing devices within which the invention may be incorporated are rudimentary to those having skill in the art and need not be described at length here.

At least one of the computers 101, 103, for example the computer 101, by executing one or more appropriate computer programs in accordance with the invention, establishes an emulator link 107. The emulator link 107 comprises a virtual network link operating upon outgoing or incoming data packets transmitted by or directed towards the computer 101, as by a network application 109 running on the machine 101. Those having skill in the art will appreciate that many other operating environments are possible, including those involving more than two computers generating network traffic, as well as those involving a single computer, and those involving emulation programs executing on more than one computer. Thus the environment depicted in simplified form in FIG. 1 should not be taken as limiting. Moreover, the emulator link may be established by an intermediary device acting as a router or bridge intercepting network traffic between two machines linked thereto.

Overview of Network Emulator Architecture

Figure 2:
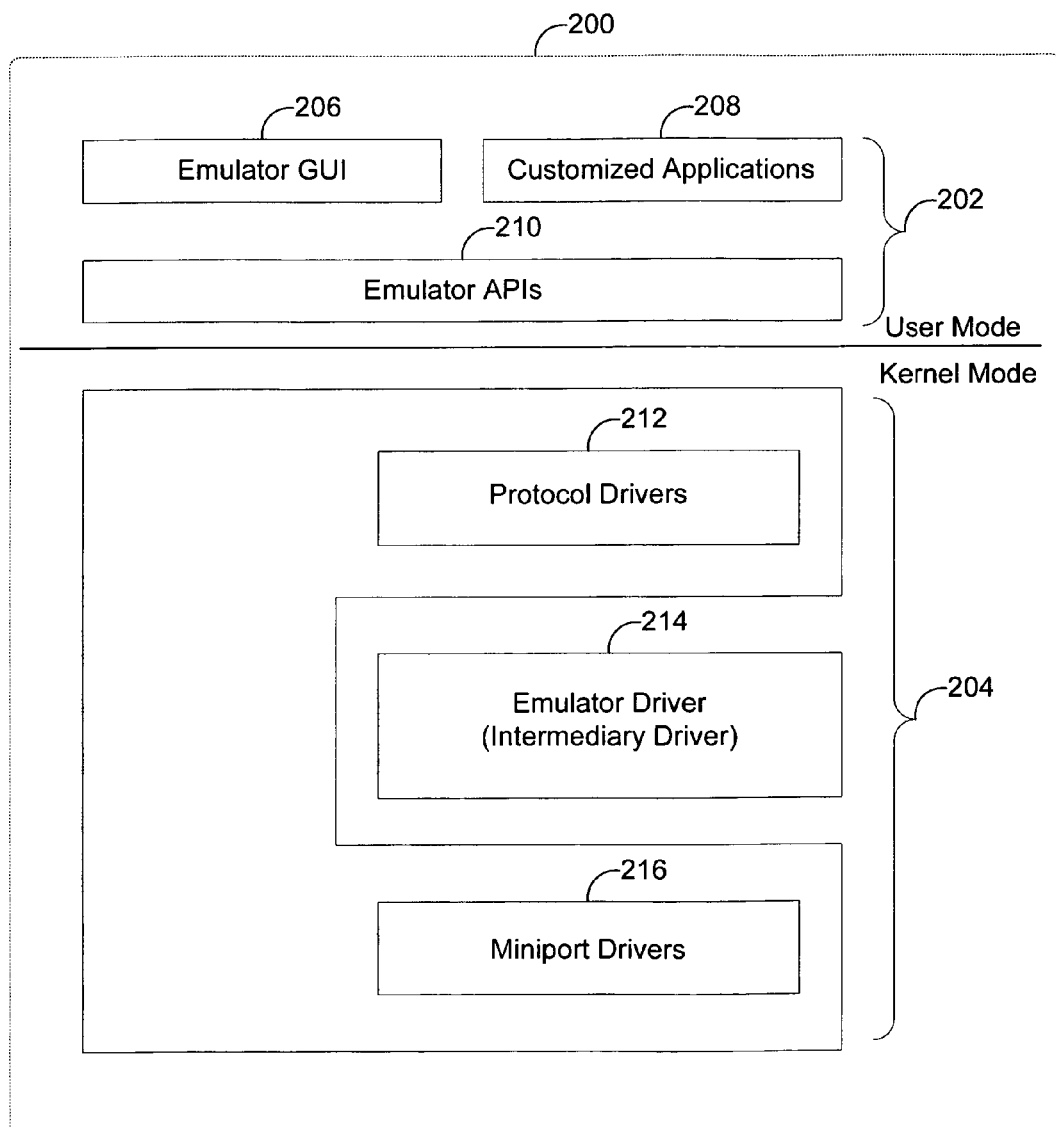
FIG. 2 is a diagram providing a general view of the architecture of a network emulator in accordance with the invention.

FIG. 2 shows a general view of the architecture of a network emulator in accordance with the present invention. The network emulator 200 comprises two parts, a user-mode application part 202 and a kernel-mode driver part 204.

The user-mode part 202 includes as its principal component the emulator application programming interface (API) 210. In one embodiment the emulator API component 210 is a user-mode dynamically linked library (DLL) that exposes C APIs. A user can write customized applications 208 invoking functions exposed in the API 210. In this way, the user supplies parameters to the modules of the driver part 204 in order to configure and control the emulator 200. Aspects of the API are described further in the commonly-assigned co-pending U.S. patent application, "Method and System for Network Emulation," application Ser. No. 10/951,985, filed Sep. 28, 2004, incorporated herein by reference. The emulator 200 supports a dynamic profile enabling emulation of various kinds of network links, such as GPRS, broadband, or 56 Kbps modem. A graphical user interface utility 206 is provided for convenient setup of emulation parameters, to run and stop the emulation, and to monitor the emulation results.

The core emulation procedures of the network emulator 200 are performed by a plurality of modules residing in the kernel-mode component 204. An emulator driver 214 captures all packets sent and received by the host in which the emulator is installed. The emulator driver 214 processes the captured packets in accordance with given emulation parameters. After processing the packets, the emulator driver 214 sends the packets out in accordance with the emulation results. In one embodiment the emulator driver 214 is an NDIS intermediate driver situated above miniport drivers 216 and below network protocol drivers 212 in a layered network driver architecture.

The implementation of core emulation procedures in kernel mode enables the emulator 200 to achieve high performance. In one embodiment the emulator 200 is able to emulate bandwidth higher than 90 Mbps on 100 Mbps Ethernet and higher than 300 Mbps on Gigabit Ethernet. The user-mode part 202 is reserved principally for monitoring and control purposes. The network emulator 200 thus avoids the performance bottleneck that results from performance of emulation in user-mode, due to the overhead of context switches.

Core Components of the Emulator Driver

Figure 3:
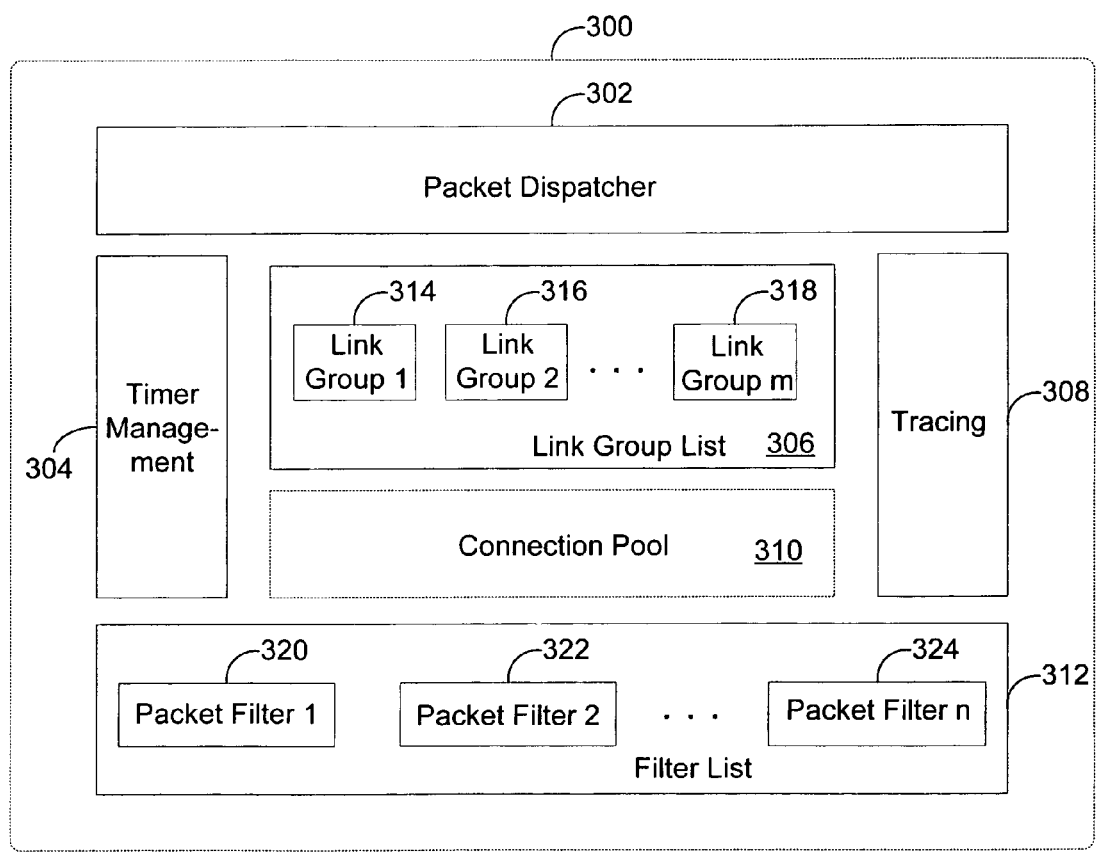
FIG. 3 is a diagram showing the architecture of core components of a network emulator driver in accordance with the invention.

The emulator driver 214 contains a number of core components, the architecture of which is illustrated in FIG. 3. After a packet is captured by the driver 300, the packet is passed to a filter list 312. The filter list 312 filters packets with respect to which the user wishes to perform emulation. The filter list 312 sends the filtered packets to a virtual network link having network characteristics based on configurations specified by the user.

The filter list 312 comprises a list of packet filters 320, 322, 324. These packet filters 320, 322, 324 have a logical OR relationship with one another. Packets are processed by the packet filters 320, 322, 324 one by one in a "first match, first process" manner. This means that a packet is processed by the first filter that establishes a match to it, such as the filter 320, and the packet is not passed to the subsequent filters. Each packet filter attempts to match packets with respect to such criteria as IP version, protocol type, source IP address or mask, destination IP address or mask, port number, and NIC index. A packet filter represents a filter rule that is bound to one or more NICs.

A connection pool component 310 is used specifically for per-connection emulation, as described further below. The connection pool 310 is not used for non-connection-based emulation.

If a packet is matched by a packet filter, the packet is delivered to a link group list component 306. The link group list 306 comprises a list of link groups 313, 316, 318. Each link group, such as the link group 314, comprises one or more virtual link pairs having the same emulation parameters. In one embodiment, a link group has multiple link pairs if per-connection emulation is enabled. Each link group is associated with a particular emulation configuration. Multiple network links having diverse characteristics may thus be emulated simultaneously.

Figure 4:
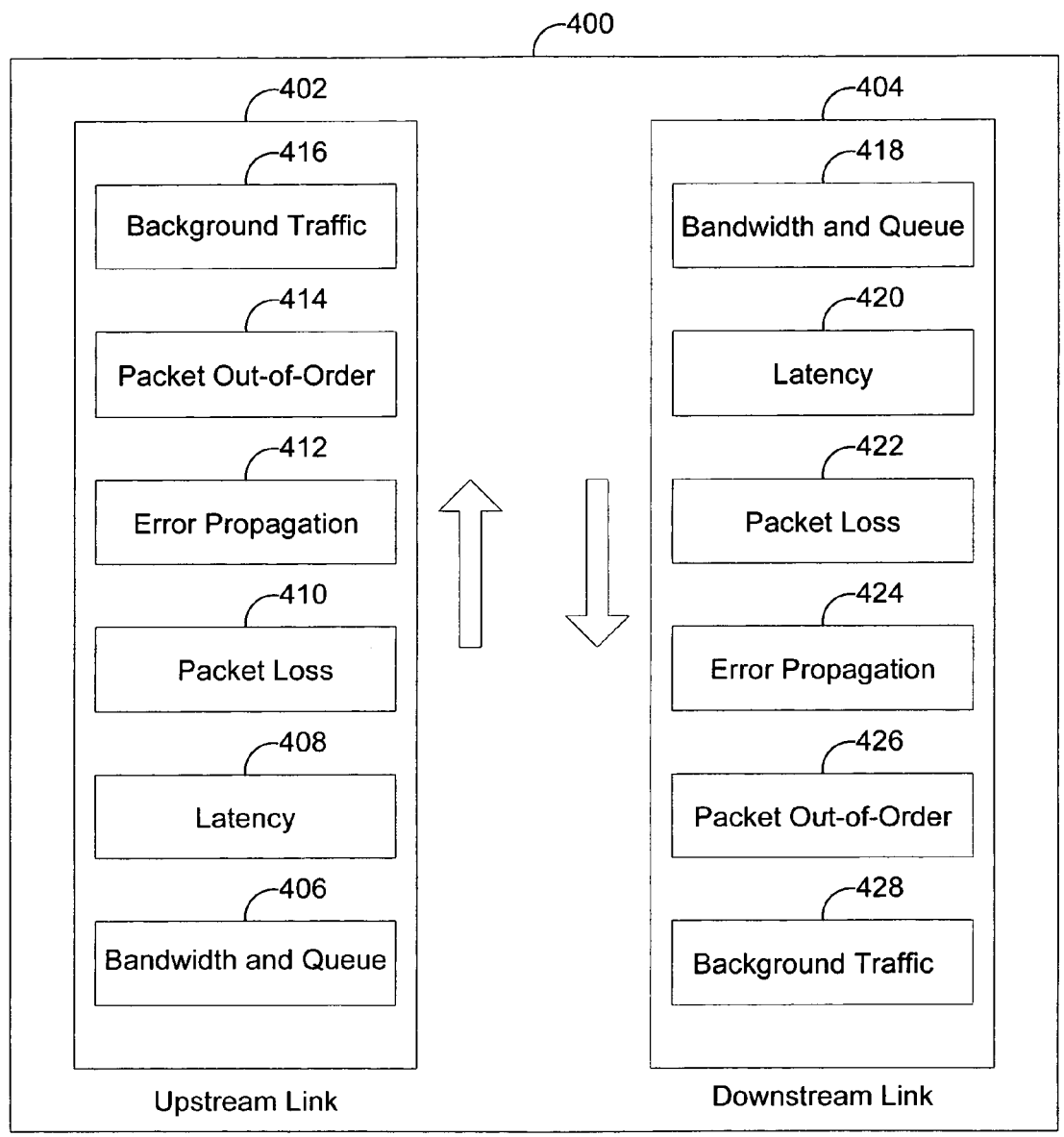
FIG. 4 is a diagram showing the structure of a virtual link pair in accordance with the invention.

The structure of a virtual link pair is shown in FIG. 4. A link pair 400 comprises an upstream virtual link 402 and a downstream virtual link 404. The upstream virtual link 402 processes packets received by the host on which the embodiment of the network emulator is running. Similarly, the downstream virtual link 404 processes packets sent by the host. All emulation procedures are performed at virtual links. As shown in FIG. 4, emulation procedures include bandwidth and queue emulation 406, 418, latency emulation 408, 420, packet loss emulation 410, 422, error propagation emulation 412, 424, packet out-of-order emulation 414, 426, and background traffic emulation 416, 428. These emulation procedures, which may be associated with corresponding emulation modules forming part of the emulator driver, are described in further detail in two commonly-assigned co-pending U.S. patent applications, "Method and System for Network Emulation Using Bandwidth Emulation Techniques," application Ser. No. 10/955,812, filed Sep. 30, 2004, and "Method and System for Network Emulation Using Packet Reorder Emulation Techniques," application Ser. No.

10/955,578, filed Sep. 30, 2004, both of which applications are incorporated herein by reference.

Returning now to FIG. 3, a timer management component 304 manages all timers created by the network emulator. Most emulation algorithms are driven by timers, including bandwidth, latency, packet out-of-order and background traffic emulations. In an embodiment, the timer management component 304 is held within an individual thread of execution.

A tracing component 308 reports status information for the packets processed by the emulator. Such status information includes, for example, the length of time for which a packet was delayed, the number of bits in the packet that were corrupted, whether the packet was lost, the bandwidth and queue configuration, and the background traffic configuration. The tracing component 308 also reports information concerning the packets themselves, such as packet length, packet headers, and length of packet data. The tracing component 308 permits the user to monitor the running status of the emulator 300. In an embodiment the tracing component 308 is disabled by default because its use entails many data exchanges between user mode and kernel mode.

After a packet is processed by a virtual link, a packet dispatcher component 302 sends out the packet. In an embodiment the packet dispatcher 302 works by calling NDIS functions.

Per-Connection Emulation

The present invention provides an architecture for a network emulator that has the flexibility to support various emulation scenarios. One particular scenario is per-connection emulation: different connections established by way of the emulator experience different network conditions. The network emulator provided by the present invention is thus not limited to machine-to-machine emulation.

Figure 5:
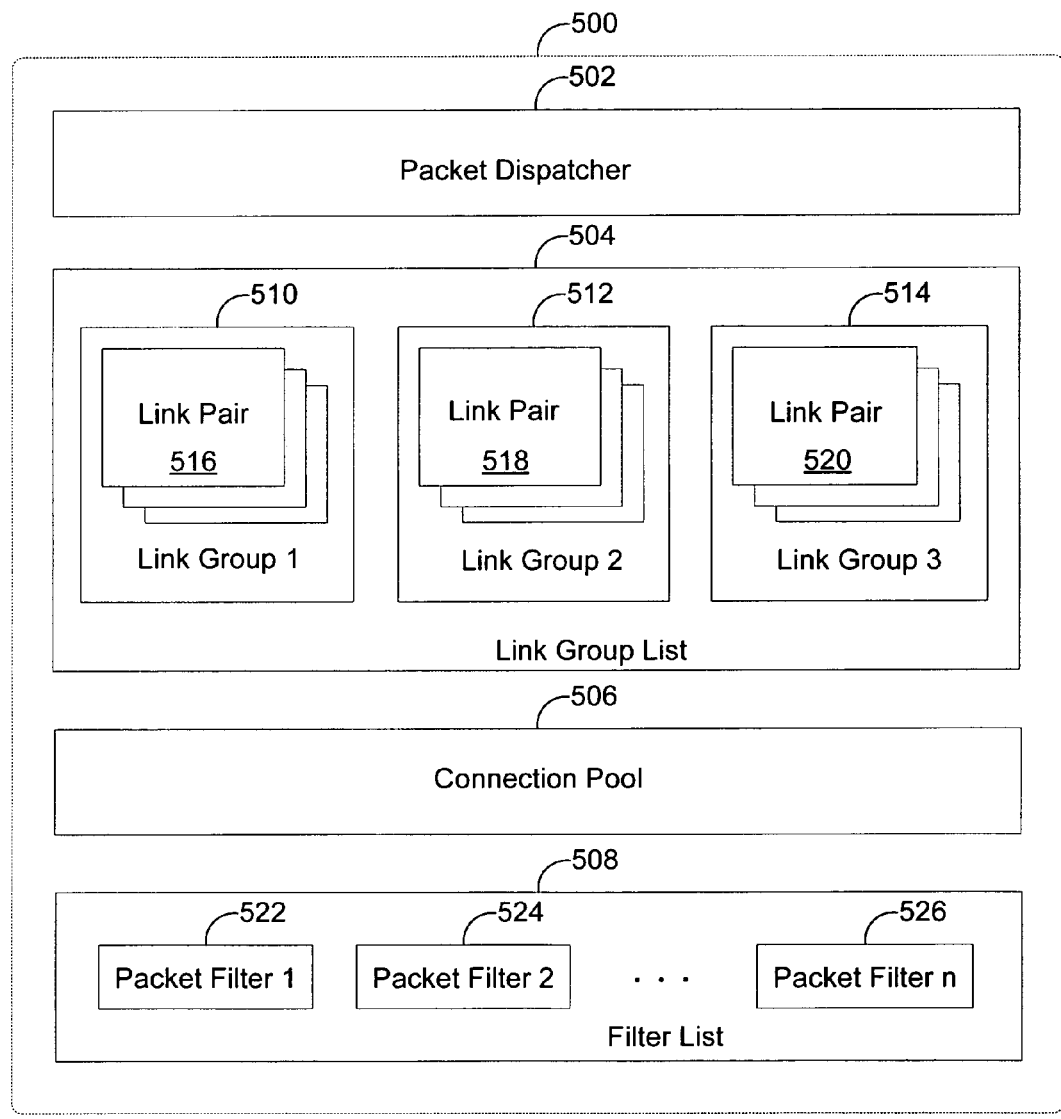
FIG. 5 is a diagram illustrating a configuration of a network emulator driver with per-connection emulation enabled.

For example, suppose a user wishes to test a web server and contemplates that 30% of connections will be by way of 56 Kbps modem, 50% of connections will be by way of cable modem, and 20% of connections will be by way of wireless LAN. FIG. 5 illustrates a configuration of the emulator 500 to emulate such a scenario. A link group list 504 having three link groups 510, 512, 514 is configured. Each of the link groups 510, 512, 514 has multiple link pairs 516, 518, 520, respectively. The first link group 510 is configured to have link characteristics of a 56 Kbps modem connection. The second link group 512 is configured to have link characteristics of a cable modem connection. The third link group 514 is configured to have link characteristics of a wireless LAN connection. A packet filter list 508 having appropriate packet filters 522, 524, 526 is created to filter out the HTTP packets to be emulated. Connection emulation is enabled, and the user specifies that 30% of connections are to be 56 Kbps connections, 50% are to be cable modem connections, and 20% are to be wireless LAN connections.

With such a configuration, the emulator 500 delivers each packet to a virtual link having appropriate network characteristics. This delivery is accomplished by way of the connection pool component 506. The connection pool 506 tracks and manages all underlying connections. By maintaining the mapping relationship between these connections and virtual links, the connection pool component 506 ensures that all connections behave as the user expects. A network emulator in accordance with the invention thereby permits multiple channel parameters to be emulated with, for example, only two physical machines, thus achieving a form of network emulation multiplexing.

Figure 6:
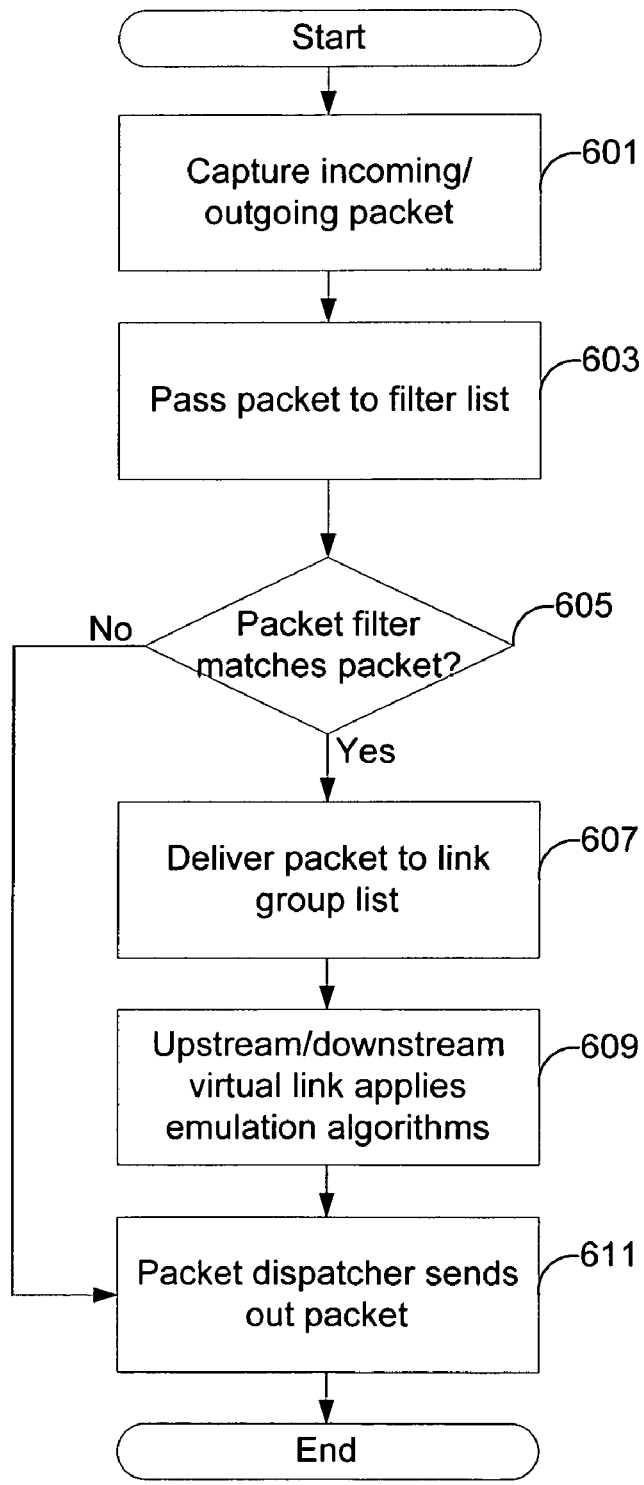
FIG. 6 is a flow diagram showing steps of a method for network emulation in accordance with the invention.

The flow diagram of FIG. 6 shows steps associated with a network emulation process in accordance with the present invention, in accordance with the description of the architecture of the invention provided above. After a start block, the process flows to block 601, at which the driver captures an incoming or outgoing packet. At block 603 the driver causes the packet to be passed to the filter list. If a packet filter in the filter list makes a match to the packet (decision block 605), the packet is delivered to the link group list at bock 607. At block 609 an upstream or downstream virtual link of a link pair in a link group applies emulation algorithms to the packet. At block 611 the packet dispatcher component sends out the packet, and the process then flows to an end block.

Preferred embodiments of the present invention are described herein, including the best mode known to the inventors for carrying out the invention. In view of the many possible embodiments to which the principles of this invention may be applied, it should be recognized that the embodiments described herein are meant to be illustrative only and should not be understood to limit the scope of the invention. Those having skill in the art will recognize that the described embodiments can be modified in arrangement and detail without departing from the spirit of the invention. Therefore, the invention as described herein contemplates all such embodiments as may come within the scope of the following claims and equivalents thereof.

What is claimed is:

1. A system for network emulation comprising:
   a host computer;
   a kernel-mode emulator driver running on the host computer that comprises:
      a link group list that includes one or more link groups, each link group in the link group list comprises at least one virtual link pair having an upstream virtual link and a downstream virtual link;
      a packet filter list that includes filters that filter a captured packet and selectively rout the packet to one of the plurality of virtual links; wherein each of the plurality of the virtual links is configured to have characteristics representing a different physical connection and the selectively routed virtual link applies an emulation procedure to the packet; wherein each packet filter represents a filter rule that is bound to one or more network interface cards (NICs) and each captured packet is matched by a packet filter in the packet filter list with respect to one or more criteria comprising at least one of an IP version, a protocol type, a source IP address, a source IP mask, a destination IP address, a destination IP mask, a port number, and a NIC index;
      a timer management component that manages a timer associated with the emulation procedure; and
      a packet dispatcher component that sends out the packet, wherein the packet is associated with one of a plurality of emulated connections such that there are more connections emulated than there are physical connections; and
   a user-mode application component running on the host computer that supplies a configuration parameter to the driver.

2. The system of claim 1, wherein the host computer has at least one network interface and is linked to a second computer by way of a local physical network.

3. The system of claim 1, wherein the driver further comprises a connection pool component for per-connection emulation.

4. The system of claim 1, wherein the link group list comprises at least one link group associated with a particular emulation configuration.

5. The system of claim 1, wherein the emulation procedure comprises at least one of a bandwidth and queue emulation procedure, a latency emulation procedure, a packet loss emulation procedure, an error propagation emulation procedure, a packet out-of-order emulation procedure, and a background traffic emulation procedure.

6. The system of claim 1, wherein the driver uses a plurality of modules to perform the emulation procedure.

7. The system of claim 1, wherein the packet filter list comprises a plurality of packet filters having a logical OR relationship to one another.

8. The system of claim 1, wherein the packet filter list processes each captured packet in a first match, first process manner.

9. The system of claim 1, wherein the driver further comprises a tracing component for reporting information regarding the packet.

10. The system of claim 1, wherein the application component further comprises a dynamically-linked library exposing an application programming interface.

11. The system of claim 1, wherein the application component further comprises a graphical user interface for monitoring the emulation.

12. A method for emulating a network link on a host computer, the method comprising:
    specifying, by way of a user-mode application running on the host computer, an emulator configuration;
    filtering, at a filter of a filter list, a packet captured by a kernel-mode driver running on the host computer; wherein each filter represents a filter rule that is bound to one or more network interface cards (NICs) and filtering the packet comprises matching the packet with respect to at least one criterion comprising: an IP version, a protocol type, a source IP address, a source IP mask, a destination IP address, a destination IP mask, a port number, and a NIC index;
    applying, at a virtual link of a link group list, an emulation procedure to the packet such that the packet is selectively routed at the filter list to one of a plurality of virtual links; wherein each of the plurality of the virtual links is configured to have characteristics representing a different physical connection; wherein applying the emulation procedure comprises applying the emulation procedure by way of at least one link group having at least one virtual link pair, wherein the virtual link pair is associated with an emulation configuration and comprises an upstream virtual link and a downstream virtual link;
    reporting, by a tracing component, information regarding the packet;
    associating the packet with one of a plurality of emulated connections such that there are more connections emulated than there are physical machines present; and
    sending out the packet.

13. The method of claim 12, wherein specifying the emulator configuration comprises enabling per-connection emulation.

14. The method of claim 12, wherein filtering the packet comprises filtering the packet by a first filter that establishes a match to the packet.

15. The method of claim 12, wherein applying the emulation procedure to the packet further comprises:
    if the packet is received by the host computer, applying the emulation procedure to the packet by way of the upstream virtual link; and
    if the packet is sent by the host computer, applying the emulation procedure to the packet by way of the downstream virtual link.

16. The method of claim 12, wherein applying the emulation procedure comprises applying one of a bandwidth and queue emulation procedure, a latency emulation procedure, a packet loss emulation procedure, an error propagation emulation procedure, a packet out-of-order emulation procedure, and a background traffic emulation procedure.

17. A computer-readable medium having computer-executable instructions for emulating a network link on a host computer, the instructions comprising:
    specifying, by way of a user-mode application running on the host computer, an emulator configuration;
    filtering, at a filter of a filter list, a packet captured by a kernel-mode driver running on the host computer; wherein each filter represents a filter rule that is bound to one or more network interface cards (NICs) and filtering the packet comprises matching the packet with respect to at least one criterion comprising: an IP version, a protocol type, a source IP address, a source IP mask, a destination IP address, a destination IP mask, a port number, and a NIC index;
    applying, at a virtual link of a link group list, an emulation procedure to the packet such that the packet is selectively routed at the filter list to one of a plurality of virtual links; wherein each of the plurality of the virtual links is configured to have characteristics representing a different physical connection; wherein applying the emulation procedure comprises applying the emulation procedure by way of at least one link group having at least one virtual link pair, wherein the virtual link pair is associated with an emulation configuration and comprises an upstream virtual link and a downstream virtual link;
    reporting, by a tracing component, information regarding the packet;
    associating the packet with one of a plurality of emulated connections such that there are more connections emulated than there are physical machines present; and
    sending out the packet.

18. The computer-readable medium of claim 17, wherein specifying the emulator configuration comprises enabling per-connection emulation.

19. The computer-readable medium of claim 17, wherein filtering the packet comprises filtering the packet by a first filter that establishes a match to the packet.

20. The computer-readable medium of claim 17, wherein applying the emulation procedure to the packet further comprises:
    if the packet is received by the host computer, applying the emulation procedure to the packet by way of the upstream virtual link; and
    if the packet is sent by the host computer, applying the emulation procedure to the packet by way of the downstream virtual link.

21. The computer-readable medium of claim 17, wherein applying the emulation procedure comprises applying one of a bandwidth and queue emulation procedure, a latency emulation procedure, a packet loss emulation procedure, an error propagation emulation procedure, a packet out-of-order emulation procedure, and a background traffic emulation procedure.

22. A computer-readable medium storing computer-executable instructions and computer-readable data for implementing a kernel-mode network emulator driver having components comprising:

a link group list that includes one or more link groups, each link group in the link group list comprises at least one virtual link pair having an upstream virtual link and a downstream virtual link;

a packet filter list that includes filters that filter a captured packet and selectively rout the packet to one of the plurality of virtual links; wherein each of the plurality of the virtual links is configured to have characteristics representing a different physical connection and the selectively routed virtual link applies an emulation procedure to the packet; wherein each packet filter represents a filter rule that is bound to one or more network interface cards (NICs) and each captured packet is matched by a packet filter in the packet filter list with respect to one or more criteria comprising at least one of an IP version, a protocol type, a source IP address, a source IP mask, a destination IP address, a destination IP mask, a port number, and a NIC index;

a timer management component that manages a timer associated with the emulation procedure; and a packet dispatcher component that sends out the packet, wherein the packet is associated with one of a plurality of emulated connections such that there are more connections emulated than there are physical connections present.

* * * * *